(12) United States Patent
Vachette

(10) Patent No.: US 6,462,734 B1
(45) Date of Patent: Oct. 8, 2002

(54) SYSTEM AND PROCESS FOR WRITING BY HAND ON A DIGITAL IMAGE

(75) Inventor: Thierry Vachette, Esbarres (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/407,926

(22) Filed: Sep. 29, 1999

(30) Foreign Application Priority Data

Oct. 5, 1998 (FR) .............................. 98 12588

(51) Int. Cl.[7] .............................. G09G 5/00; G09G 1/00
(52) U.S. Cl. ...................... 345/173; 345/179; 345/180; 345/636; 178/18.01; 178/19.01
(58) Field of Search ................................ 345/2, 3, 173, 345/179, 358, 864, 866, 867, 180, 182, 183, 636, 634; 178/18.01, 18.03, 19.01, 19.02, 19.03, 19.04, 19.05, 20.01; 283/45

(56) References Cited

U.S. PATENT DOCUMENTS

| | | | | |
|---|---|---|---|---|
| 5,475,401 A | * | 12/1995 | Verrier | 345/179 |
| 5,668,897 A | * | 9/1997 | Stolfo | 382/283 |
| 5,748,780 A | * | 5/1998 | Stolfo | 382/232 |
| 5,754,186 A | | 5/1998 | Tam et al. | |
| 5,777,605 A | * | 7/1998 | Yoshinobu | 345/173 |
| 6,082,774 A | * | 7/2000 | Schlauch | 283/67 |
| 6,146,148 A | * | 11/2000 | Stuppy | 434/322 |

FOREIGN PATENT DOCUMENTS

| | | | | |
|---|---|---|---|---|
| EP | 843461 | * | 5/1998 | H04N/1/387 |
| FR | 2 697 359 | | 4/1994 | |
| GB | 2 130 838 | | 6/1984 | |
| GB | 2 246 929 | | 2/1992 | |
| JP | 2000330726 A | * | 5/1999 | G06F/3/03 |

* cited by examiner

Primary Examiner—Matthew Luu
Assistant Examiner—Wesner Sajous
(74) Attorney, Agent, or Firm—David A. Novais

(57) ABSTRACT

A system and process for combining a prerecorded digital image with hand written graphic elements. The system comprises at least one computer for managing the links between the various parts of the system; at least one mechanism for supplying a prerecorded digital image to the system; and a peripheral (P). The peripheral includes, a mechanism for, on the one hand, displaying the prerecorded image and, on the other hand, digitally recording data corresponding to the hand written graphic elements; and a processor for managing the functions of the mechanism for displaying the prerecorded image and for communicating with the computer.

8 Claims, 9 Drawing Sheets

SYSTEM AND PROCESS FOR WRITING BY HAND ON A DIGITAL IMAGE

FIELD OF THE INVENTION

The present invention relates to a system and process for writing by hand on a digital image, and in particular a system and process which allow a prerecorded digital image to be combined with personalized graphic elements.

BACKGROUND OF THE INVENTION

In order to personalize a photograph with a message or a drawing, a person can write with a pen directly onto the photographic paper. However, it is difficult to get the ink to adhere to the photographic paper and the result obtained is often very mediocre.

Digital imaging has made image personalization easier. There are techniques for writing on digital images such as those for instance described in Patent Application EP 843 461. EP 843 461 describes a process for combining a prerecorded digital image with text or personalized graphics. The process includes writing the desired text onto a support which is then scanned. The scanned text is then inserted at a predetermined place in the digital image. Such a technique does not allow users to write a message wherever they want on the photograph because the addition is inserted at a predetermined place in the digital image. Moreover, users cannot see the result of their work immediately afterwards, so if it is not suitable, they are not aware of it until after scanning and combining the message and the image. Such a method is therefore neither very practical in use nor very intuitive.

There are other more intuitive devices for adding personalized graphic elements to prerecorded images. Such devices are constituted, for example, by a graphic tablet, like the tablet model PL300 marketed by the Wacom company, and a pen especially designed to write on the tablet, as represented in FIG. 1. When the first tip of the pen 30 is applied to the tablet 20, data concerning the application of the pen is recorded. This data is especially the coordinates of the position of the pen 30 on the tablet 20, the pressure with which the pen 30 is applied to the tablet 20, or even the angle of inclination of the pen 30. Also at its other end such a pen has an eraser function. Using this data, image processing software such as for example Photoshop® can be configured to display a point corresponding to each coordinate of the pen recorded, as represented in FIG. 2.

In certain photographic points-of-sale where this type of tablet is made available to customers so that they can add personalized elements to a photograph, it is desirable that several customers can use such a tablet without having to manage the other controls required for its use, such as supplying a prerecorded image to the tablet, or printing a prerecorded image with personalized elements. This management is preferably done by one or more persons operating the point-of-sale. The devices described above do not allow the use of the tablet to be separated from the management of the other controls.

SUMMARY OF THE INVENTION

An object of the invention is to provide a new system and a process that allows a user to hand write on a photographic type image in a very simple and intuitive way and, further allow another person to manage the other controls.

The invention relates to a system for combining a prerecorded digital image with hand written graphic elements that comprises: at least one computer for managing links between various parts of the system; at least one means for supplying a prerecorded digital image to the system, and a peripheral that comprises: a means for, on the one hand, displaying the prerecorded image and, on the other hand, digitally recording data corresponding to the hand written graphic elements; and a processor for managing the functions of the means for displaying the prerecorded image and for communicating with the computer.

The invention further relates to a process for combining a prerecorded digital image with personalized graphic elements. The process comprises the steps of: acquiring a prerecorded digital image, displaying the prerecorded digital image on a screen; writing and recording a personalized graphic element directly on the screen; and publishing the prerecorded digital image combined with the personalized graphic elements.

The invention further relates to a system for obtaining a prerecorded digital image with hand written graphic elements. The system comprises: at least one computer which manages links between various parts of the system; at least one image supplier which supplies a prerecorded digital image to the system; and a peripheral which comprises: a display element which displays the prerecorded image and which records data corresponding to the hand written graphic elements; and a processor which manages functions of the display element and which communicates with the at least one computer.

BRIEF DESCRIPTION OF THE DRAWINGS

Other characteristics will appear on reading the following description, with reference to the drawings wherein.

DETAILED DESCRIPTION OF THE INVENTION

Figure 3:
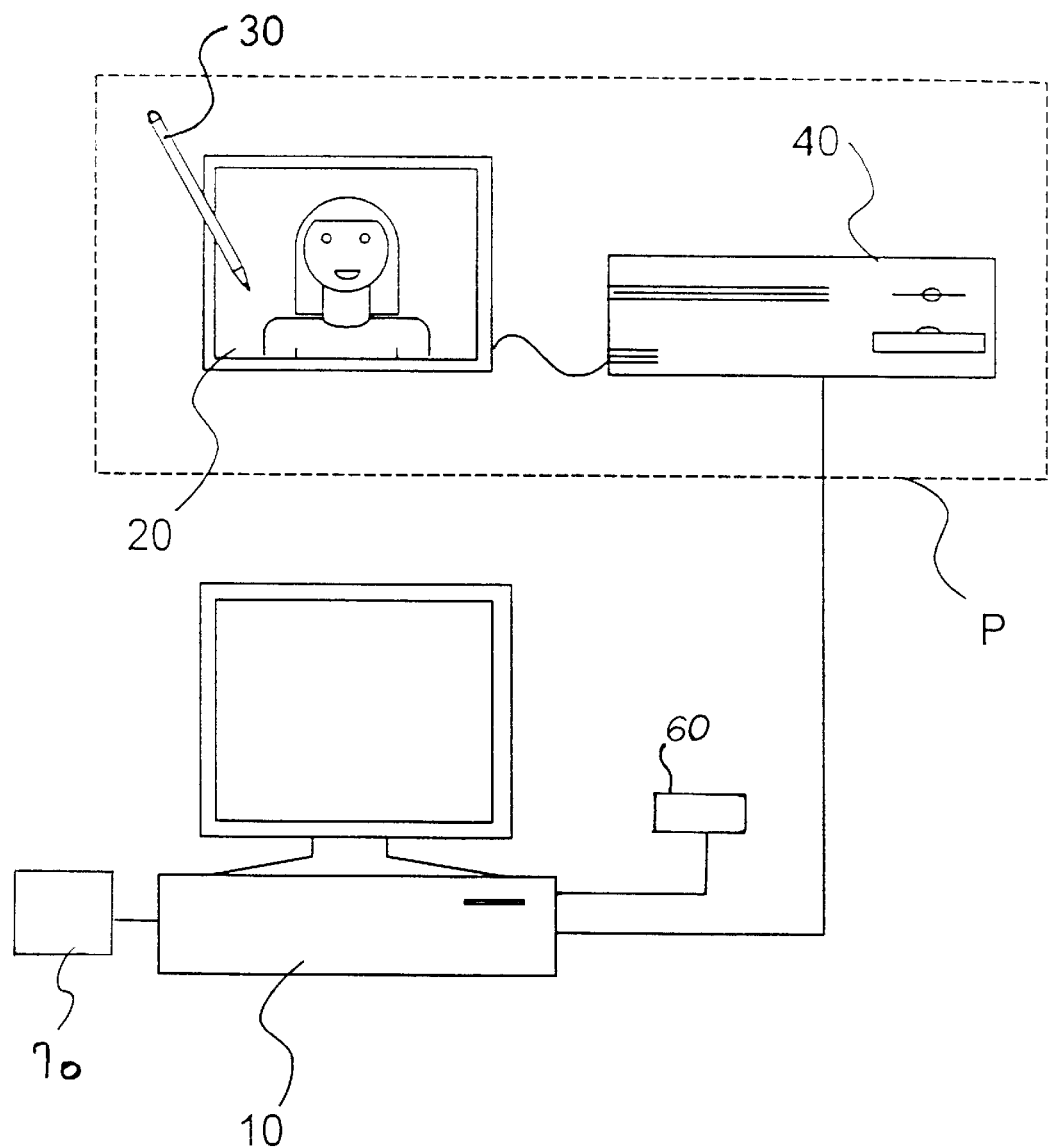
FIG. 3 represents the system for combining a prerecorded digital image with hand written graphic elements according to the invention.

The system and process for combining prerecorded digital images with hand written graphic elements according to the invention can be seen by referring to FIG. 3. The system comprises a computer 10 which manages the links between the various means provided in the system.

One means 70, is provided to supply the system with a prerecorded digital image. This is, for example, a digital camera, like for example a DCS® device marketed by Kodak, directly connected to the computer 10. It can also be a scanner directly connected to the computer 10 and which allows, for example, the digitization of a monochrome or polychrome silver-based photograph or any other image or drawing. The scanner thus sends a signal corresponding to the scanned image to the system. The means for supplying a digital image can also be a means for reading a database comprising many prerecorded images. Such a database is for instance provided on a compact disk, the means then being a compact disk reader. Clearly any other support can be used to supply a database.

The invention system comprises a peripheral P represented in FIG. 3 by the broken line box. The peripheral P comprises the means 20 for, on the one hand, displaying the prerecorded digital image and, on the other hand, digitally recording data corresponding to the hand written graphic elements.

Figure 1:
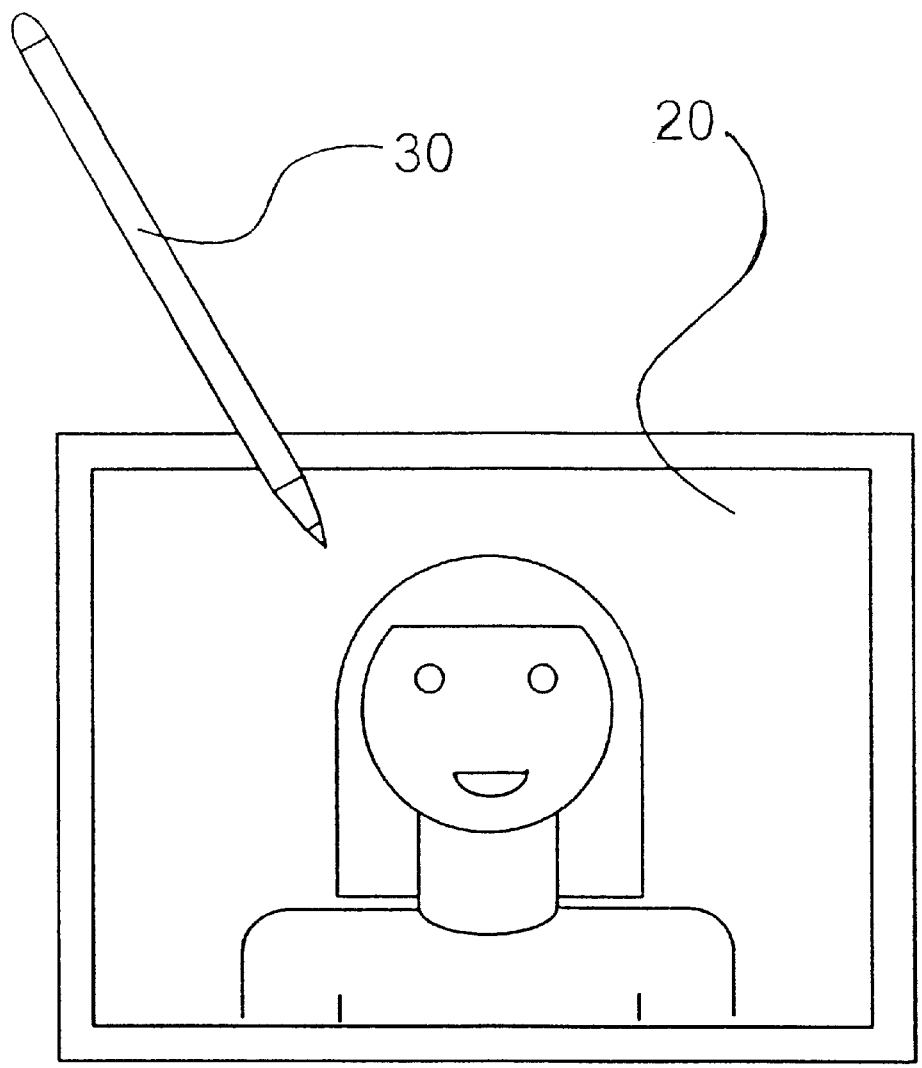
FIG. 1 represents a tablet displaying a prerecorded image and a pen.
Figure 2:
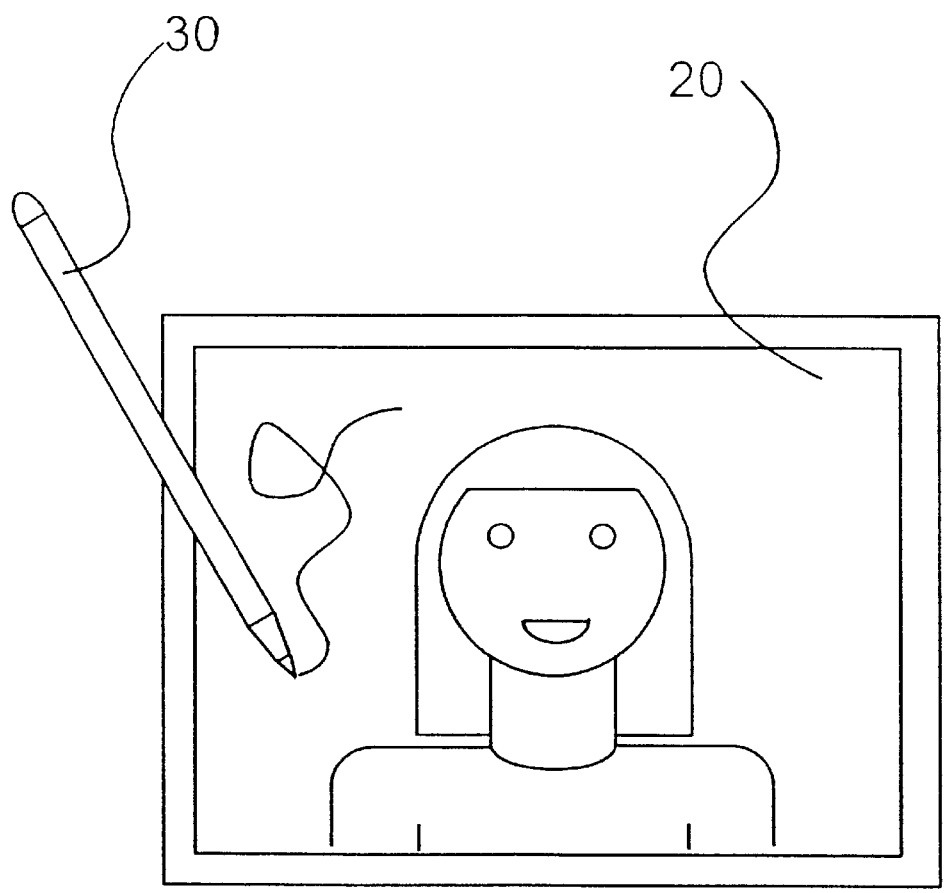
FIG. 2 represents a tablet displaying a prerecorded image onto which personalized graphic elements are written using a pen.

The means 20 is for instance, a graphic tablet, for example, the graphic tablet model PL300 marketed by Wacom, described above and shown in FIGS. 1 and 2. The tablet 20 is provided to display a digital image.

The means 30 is provided to allow a user to hand write on the tablet 20. This is a component in the form of a pen, for example, of the type marketed by Wacom, which is provided to interact with the tablet 20 and which was described above with reference to FIGS. 1 and 2.

The peripheral P further comprises a processor 40 for, on the one hand, managing the functions of the tablet 20 and, on the other hand, communicating with the computer 10. A software program is provided in the processor 40 to operate the tablet 20 and the pen 30. Such a program allows the peripheral P to acquire a prerecorded image coming from the computer 10, to check that a first image is not already displayed on the tablet 20, and if there is none, to display the second image on the tablet 20. The program also allows the prerecorded image and the personalized graphic elements to be sent to the computer 10, in two separate files, or in the same file.

Figure 6:
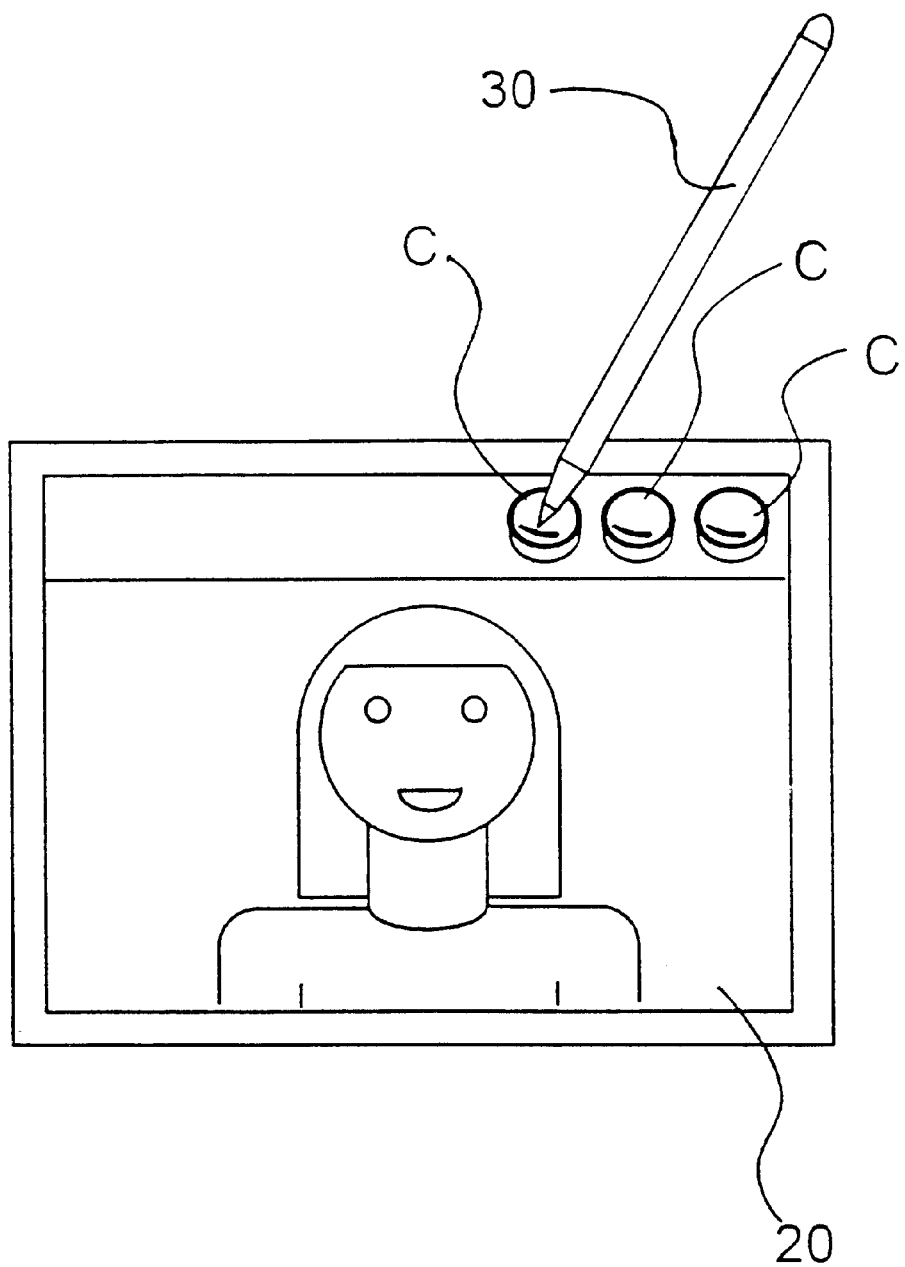
FIG. 6 represents a method of using the tablet used in the system according to the invention.
Figure 7:
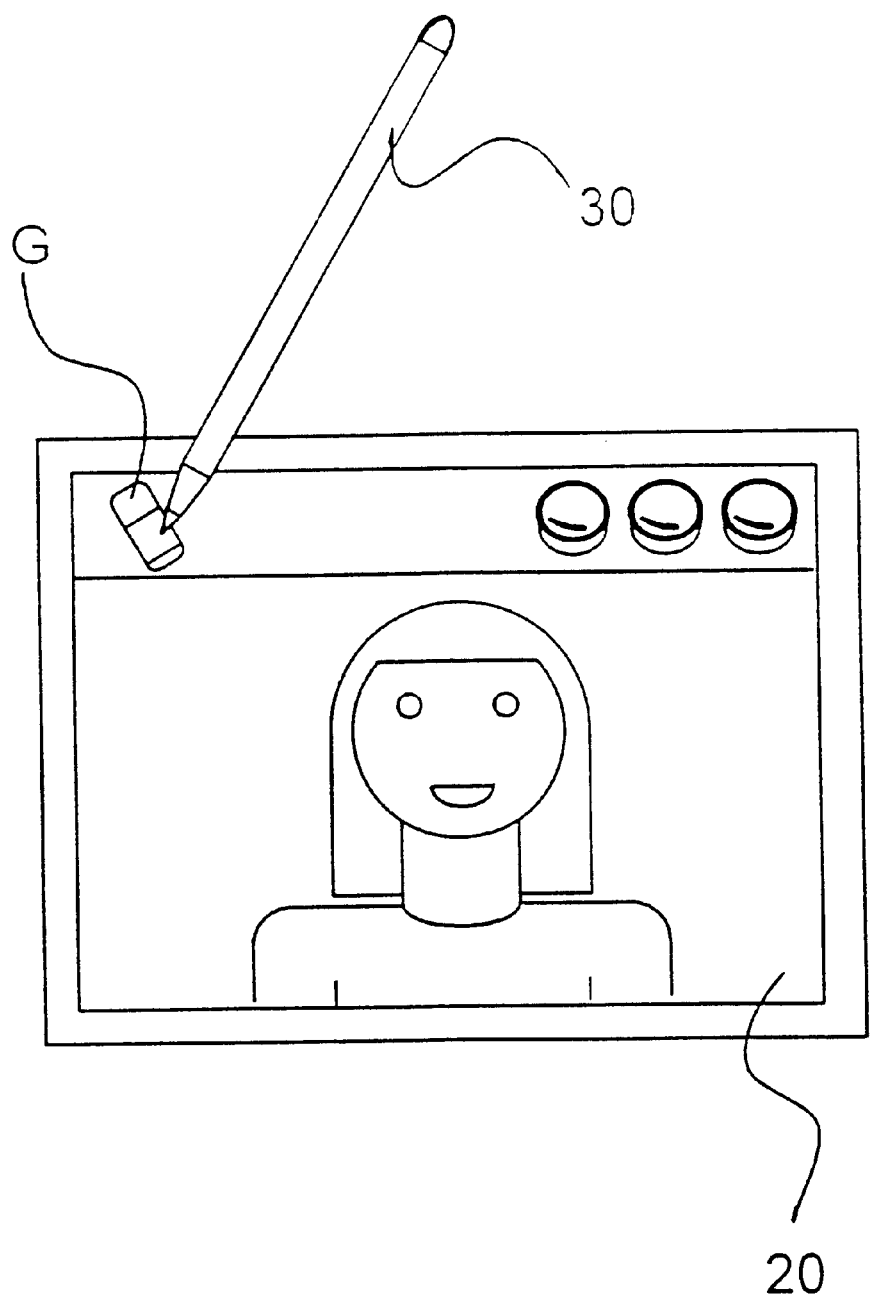
FIG. 7 represents a second method of using the tablet used in the system according to the invention.

According to one method of using the tablet 20 represented in FIG. 6, various colors C can be displayed on a part of the tablet 20 to allow the user to select the color they are going to write with on the tablet by applying the pen 30 to one of the colors. It is also possible to arrange, as represented in FIG. 7, to display an item G, for instance an eraser. When the pen is applied to the eraser, a control signal is created, which, in the case of the eraser, triggers the removal of all the graphic elements.

According to a particular embodiment of the invention, a means 60 is provided to print or publish the prerecorded image with the hand written graphic elements. The printing or publication means 60 is for instance a means for printing an image. This can be an ink jet printer, an electrophotographic printer, a laser printer, a thermal printer, a CRT type printer, or any other suitable type of printer known to those skilled in the art. The publication means can also be a means for broadcasting a file containing the digital image combined with the hand written graphic elements on a network, for instance of the Internet type.

Figure 4:
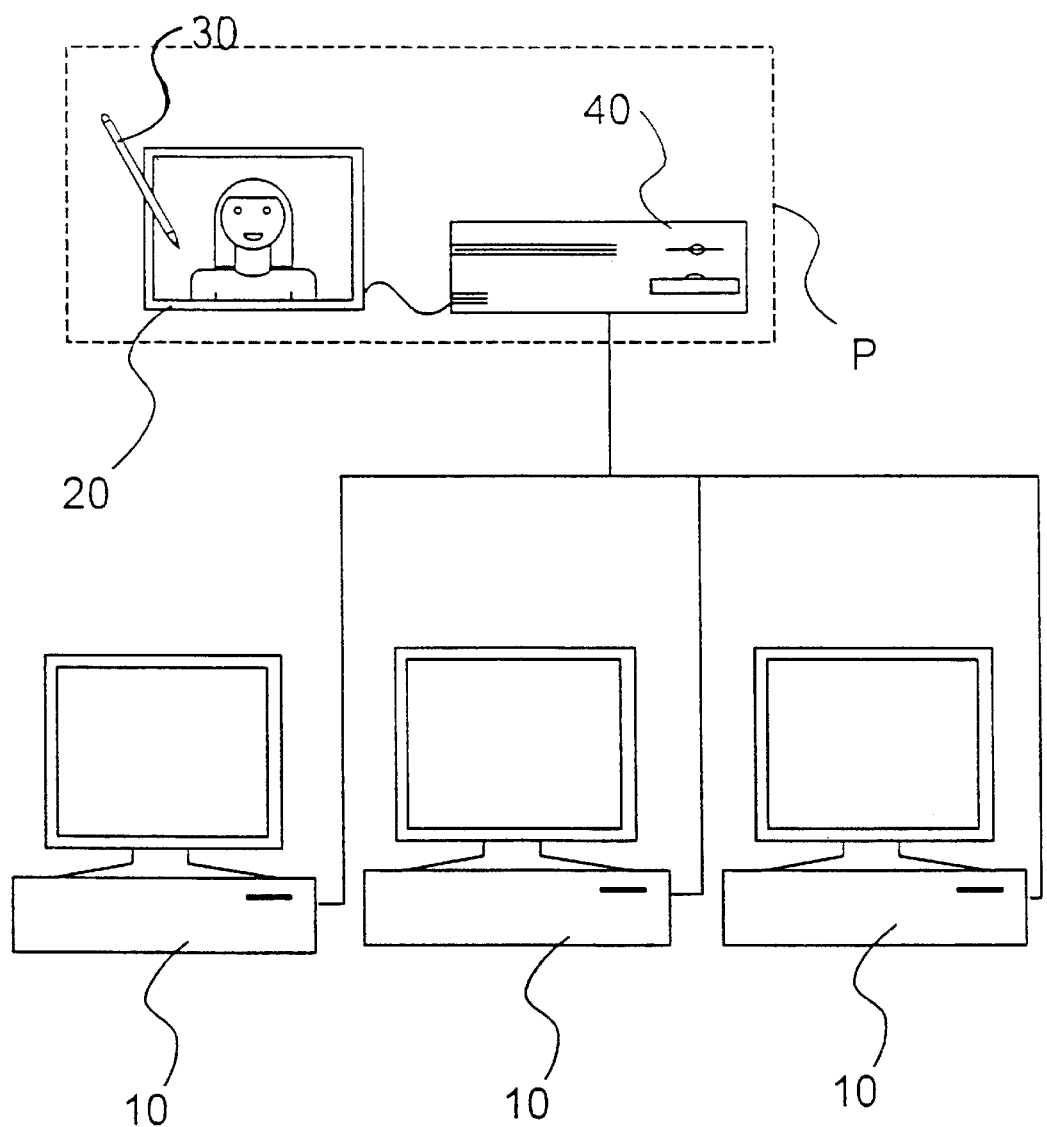
FIG. 4 represents a second embodiment of the system according to the invention.

According to another embodiment of the invention represented in FIG. 4, the system comprises a plurality of networked computers 10 provided to work with a peripheral P described above.

Figure 5:
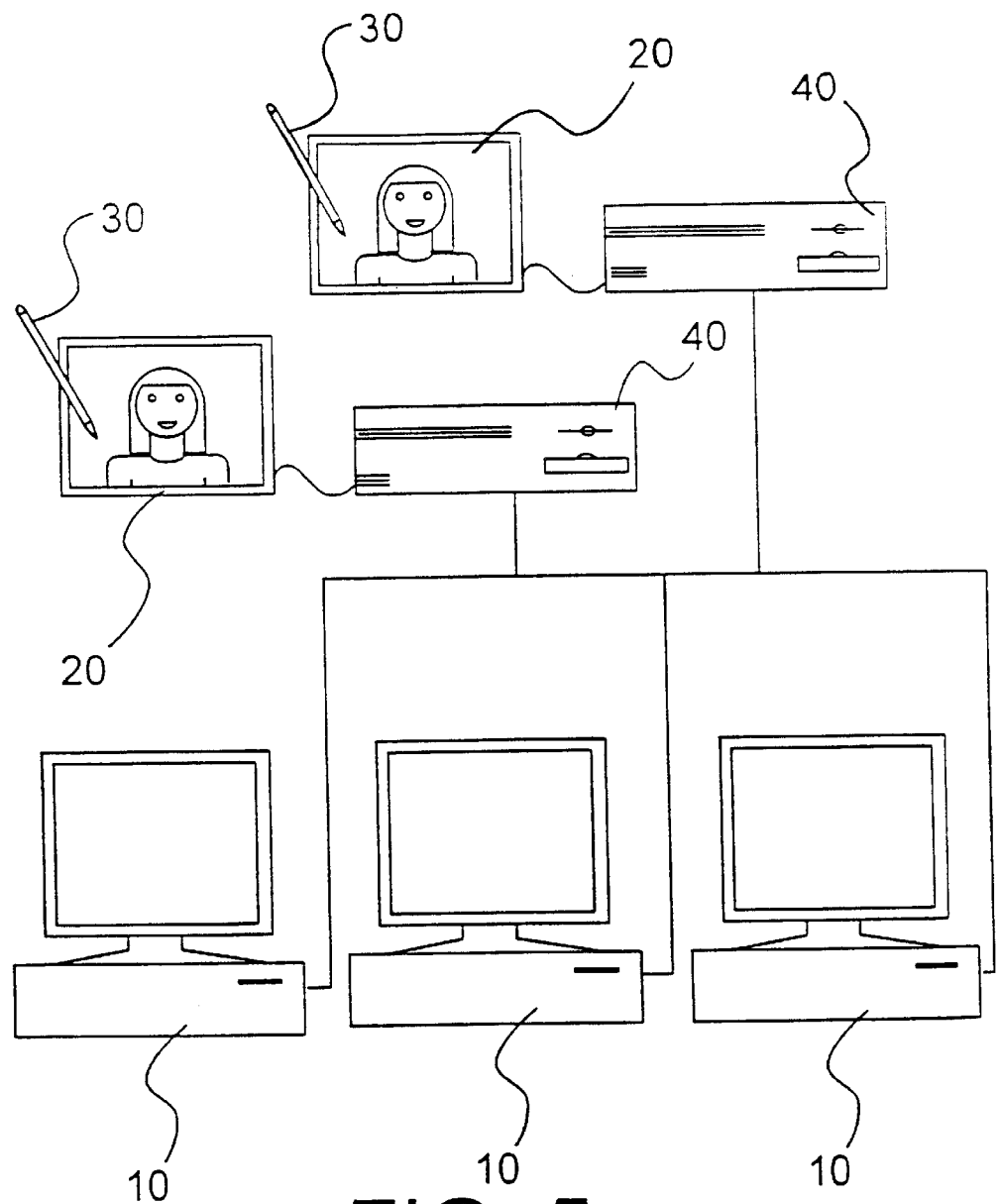
FIG. 5 represents a third embodiment of the system according to the invention.

According to another embodiment of the invention represented in FIG. 5, the system comprises a plurality of networked computers 10 provided to work with a plurality of peripherals P.

The invention system described above is for instance used in a photographic point-of-sale where a tablet of this type is made available to customers so that they can add personalized elements to a photograph. The sales staff manage the whole tablet environment.

The invention system can thus comprise a plurality of means for supplying images, for example digital cameras, and/or a plurality of tablets for displaying and adding personalized graphic elements. It can be arranged for customers to be photographed with a digital camera close to the photographic point-of-sale. A person who has been photographed by a digital camera, is allocated an identification. The digital camera is arranged to be able to be connected to the computer to supply it with the various photographic shots together with the customer identification. When the computer is supplied with the customer identification, all the shots taken of the customer will be displayed on the computer screen. The seller can for instance select the shot they think is most successful and send the file for the photographic shot to the peripheral P, and more specifically to the processor 40. The processor 40 then checks that the tablet is not already displaying an image and if not, sends the file to the tablet 20. The digital image taken by the camera is displayed on the tablet so that the customer sees its photograph on the tablet. Using the pen 30 provided to operate with the tablet, the customer is then able to write on the tablet in order to personalize its photograph. When the result is satisfactory the customer can request publication, for example a print out, either by sending a signal to the computer via the processor, or by directly sending a control signal to the printer or publication means 60.

In the embodiment described in FIG. 4, it is provided that several sellers can receive several customers at the same time, each seller using a computer 10. If several customers only wish to recover their photographs without modifying them on the tablet, the seller can command the printing of one or more photographs directly and supply them to the customer. In the embodiment described in FIG. 5, several consumers can add personalized graphic elements to their photographs at the same time.

Figure 8:
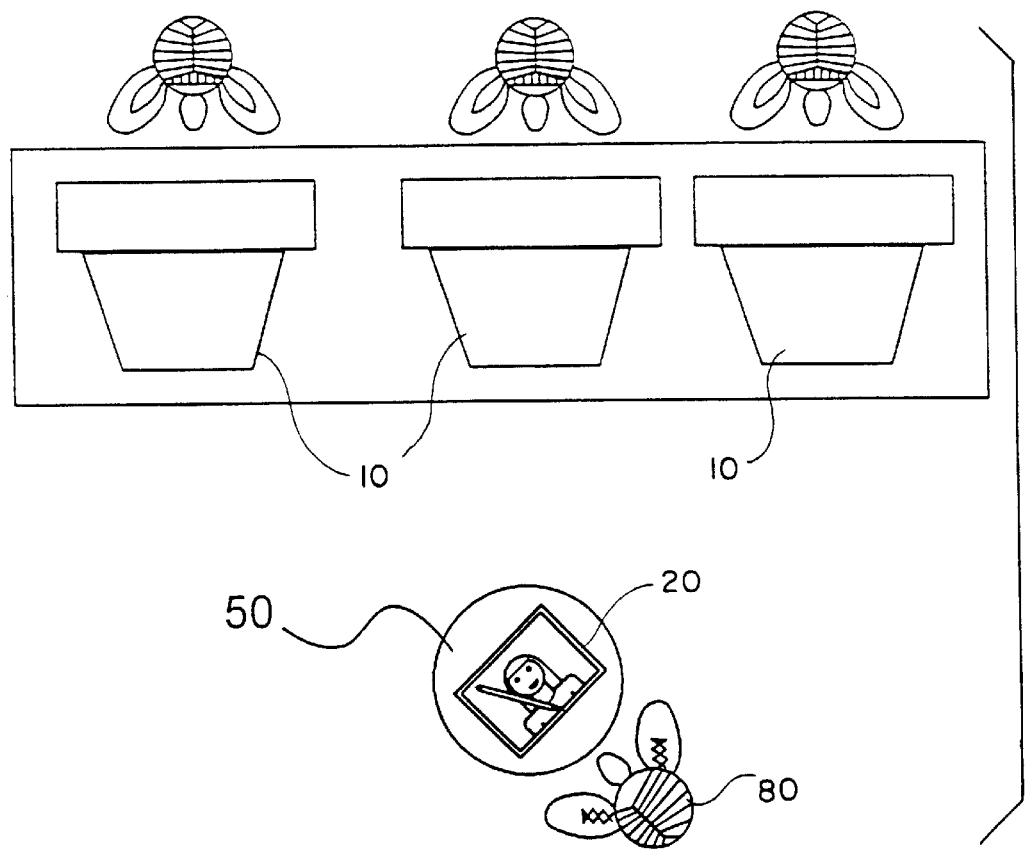
FIG. 8 represents a first arrangement of the system according to the invention.
Figure 9:
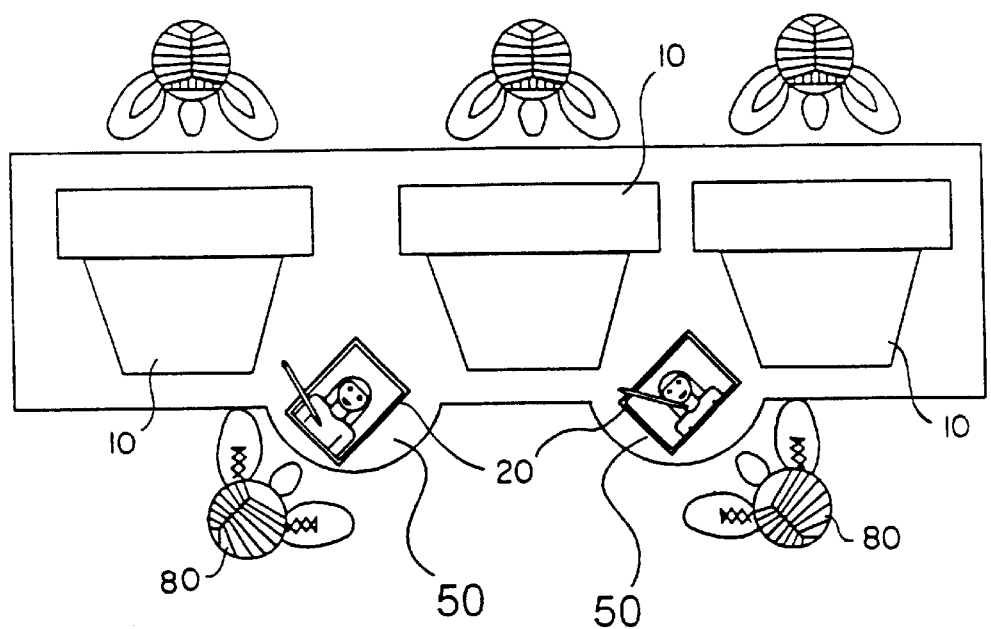
FIG. 9 represents a second arrangement of the system according to the invention.

In order to use the tablets, they can be arranged on supports 50 like the one represented in FIG. 8 or in FIG. 9. The tablet 20 is arranged on the support so that the user 80 is able to be in front of the image displayed on the means 20 when the image is in portrait format and when the image is in landscape format. On such a support, the user can be in front of the greater width of the tablet when the image is in landscape format, or in front of the smaller width when the image is in portrait format.

In the embodiments described above, an additional screen can be provided, not shown, which allows the prerecorded images for a customer to be displayed, so that it is the customer who selects the image(s) he wishes to personalize. Such a screen is then connected directly to computer 10.

In the previous embodiments, it is possible to consider adding a peripheral intended to be used by the seller, so that for example, an image, which is not desirable to display as it is, can be corrected. Such a peripheral is for instance the peripheral P described above, but can be any other suitable peripheral known to those skilled in the art. After having marked such an image on their computer screen 10, the seller sends the relevant image file to their own peripheral P, corrects the image, and then sends the relevant corrected image file to the customer's peripheral P.

The system described above allows a photograph to be personalized very easily, and for this to be done at the precise place the user wishes. Furthermore a personalized photograph is obtained very quickly. Such a system is particularly useful in theme parks, where a customer is photographed in peculiar situations.

The invention has been described in detail with particular reference to certain preferred embodiments thereof, but it will be understood that variations and modifications can be effected within the spirit and scope of the invention.

What is claimed is:

1. A system for directly handwriting and recording personalized graphic elements on a prerecorded displayed digital image, being connected with at least one supply device for supplying prerecorded digital images to said system, the system comprising:

at least one computer having a screen and linked to the supply device, said computer allowing a display of the supplied prerecorded digital images, to select at least one digital image from said supplied digital images, and to send the selected digital image to at least one peripheral external to the computer, said peripheral comprising:

a display element having a screen for displaying the selected digital image;

an interacting component for interacting with the display element, said interacting component allowing a handwriting of at least one personalized graphic element directly on the screen of the display element displaying the selected digital image, to digitally record the handwritten personalized graphic element in said display element; and a processor for managing the functions of the display element and for communicating with the at least one computer.

2. The system according to claim 1, wherein the supply device is a digital camera.

3. The system according to claim 1, wherein the display element is a graphic tablet.

4. The system according to claim 3, wherein a pen is used for writing by hand on the graphic tablet.

5. The system according to claim 1, further comprising a printing device for printing the prerecorded image and the personalized graphic elements.

6. The system according to claim 5, wherein the printing device is an ink jet printer, an electrophotographic printer, a laser printer, a thermal printer, or a CRT type printer.

7. The system according to claim 1, further comprising:

a support for allowing access to the display element, the display element being arranged on the support so that a user is able to be in front of the image displayed on the screen of the display element when said image is in landscape format.

8. A process for directly handwriting and recording personalized graphic elements on a prerecorded displayed digital image, the process comprising the steps of;

acquiring prerecorded digital images;

displaying the prerecorded digital images on a screen of a computer;

selecting at least one prerecorded digital image from said acquired digital images;

sending the selected digital image to a peripheral having a display element external to the computer;

displaying the selected digital image on a screen of the display element in the peripheral;

handwriting at least one personalized graphic element directly on the screen of the display element displaying the selected digital image, and digitally recording said personalized graphic element in said display element; and publishing the digital image personalized with the graphic element.

* * * * *